July 7, 1959 J. H. BICKFORD ET AL 2,894,242
SELF-LOCKING ELECTRIC PLUGS
Filed Jan. 4, 1957 2 Sheets-Sheet 1

INVENTORS
JOHN H. BICKFORD
DONALD E. LIPFERT
BY
Lindsey and Prutzman
ATTORNEYS

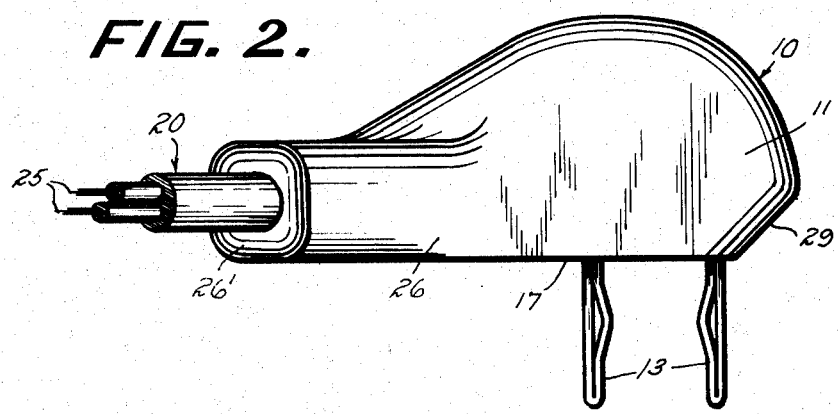
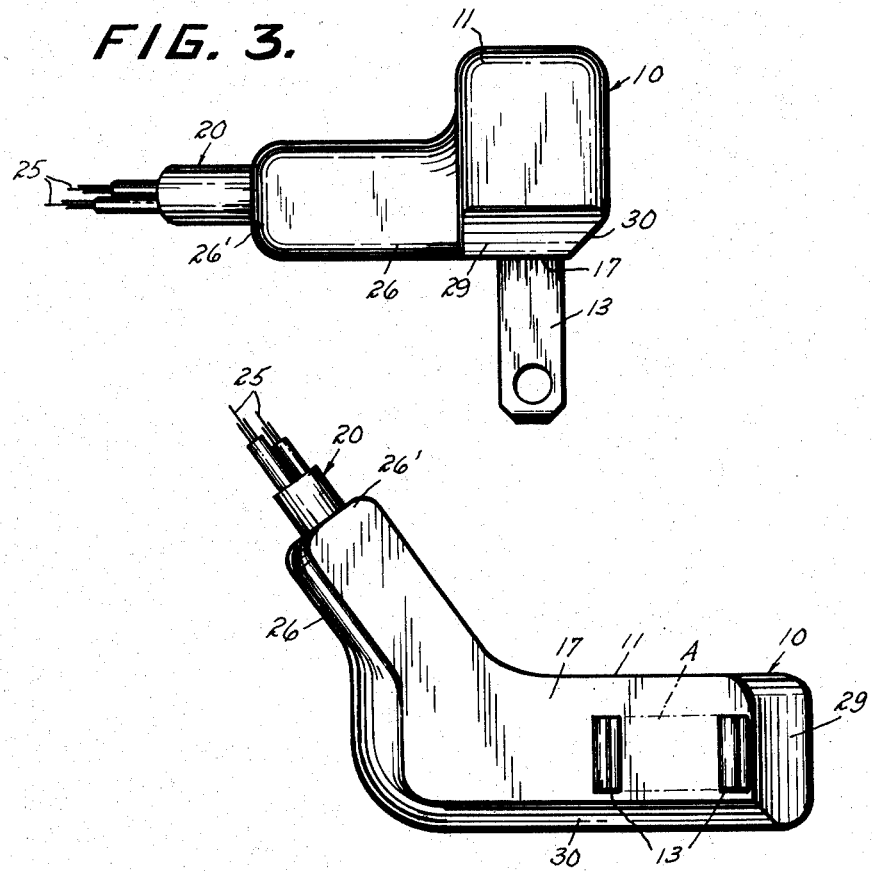

2,894,242

SELF-LOCKING ELECTRIC PLUGS

John H. Bickford, Middletown, and Donald E. Lipfert, Meriden, Conn., assignors to Raymond Engineering Laboratory, Inc., Middletown, Conn., a corporation of Connecticut Application January 4, 1957, Serial No. 632,495

5 Claims. (Cl. 339—195)

This invention relates to an electric plug for connecting a power cord to a conventional outlet or receptacle and more particularly to such an electric plug which is effectively prevented from being drawn from the outlet by the application of a pull or strain on the power cord.

Electrically operated devices such as lamps, appliances, and the like, are generally provided with a power cord having a pronged plug at its outer end which is insertable within a wall receptacle or outlet so as to connect the electrical device to a source of electric power. When such electrical devices are connected by a conventional plug, a strain or pull on the power cord tends to withdraw or dislodge the plug from the outlet as the frictional holding force between the plug prongs and outlet is easily overcome. Furthermore, where the use of a spring-wound or retractile power cord is desired with conventional domestic power plugs to permit automatic variation of the effective cord length, the constant strain or pull exerted on the plug by the retractile cord is generally sufficient to withdraw the plug from the outlet. Various expedients such as additional parts on the plug for gripping the outlet have been proposed but these generally are unacceptable commercially from the standpoint of economy and ease of use.

Accordingly, it is a primary object of this invention to provide a new and novel self-locking power plug which will resist being withdrawn by a pull or strain on its power cord but at the same time can be easily removed in the normal way.

It is another object of this invention to provide a new and improved self-locking power plug which may be used with electrical devices and which requires no additional parts other than those found in the ordinary domestic power plug.

It is a further object of this invention to provide a new and novel self-locking plug for electrical devices which is simple in construction, inexpensive to manufacture and which, if desired, may be integrally molded in a one-piece construction on its power cord.

It is a still further object of this invention to provide a new and improved self-locking plug used on a power cord which permits the use of such constant strain cords as the spring-wound or retractile type.

It is still another object of this invention to provide a new and novel self-locking plug for a power cord which may be used in conventional domestic outlets without damaging or changing the outlet.

Other objects will be in part obvious, and in part pointed out more in detail hereinafter.

The invention accordingly consists in the features of construction, combination of elements and arrangement of parts which will be exemplified in the construction hereafter set forth, and the scope of the application of which will be indicated in the appended claims.

The invention is illustrated in the accompanying drawings, wherein:

Fig. 2 is a side view of the plug of Fig. 1;

Fig. 3 is an end view of the plug of Fig. 1; and

Fig. 4 is a bottom view of the plug as viewed toward the plug face.

Figure 1:
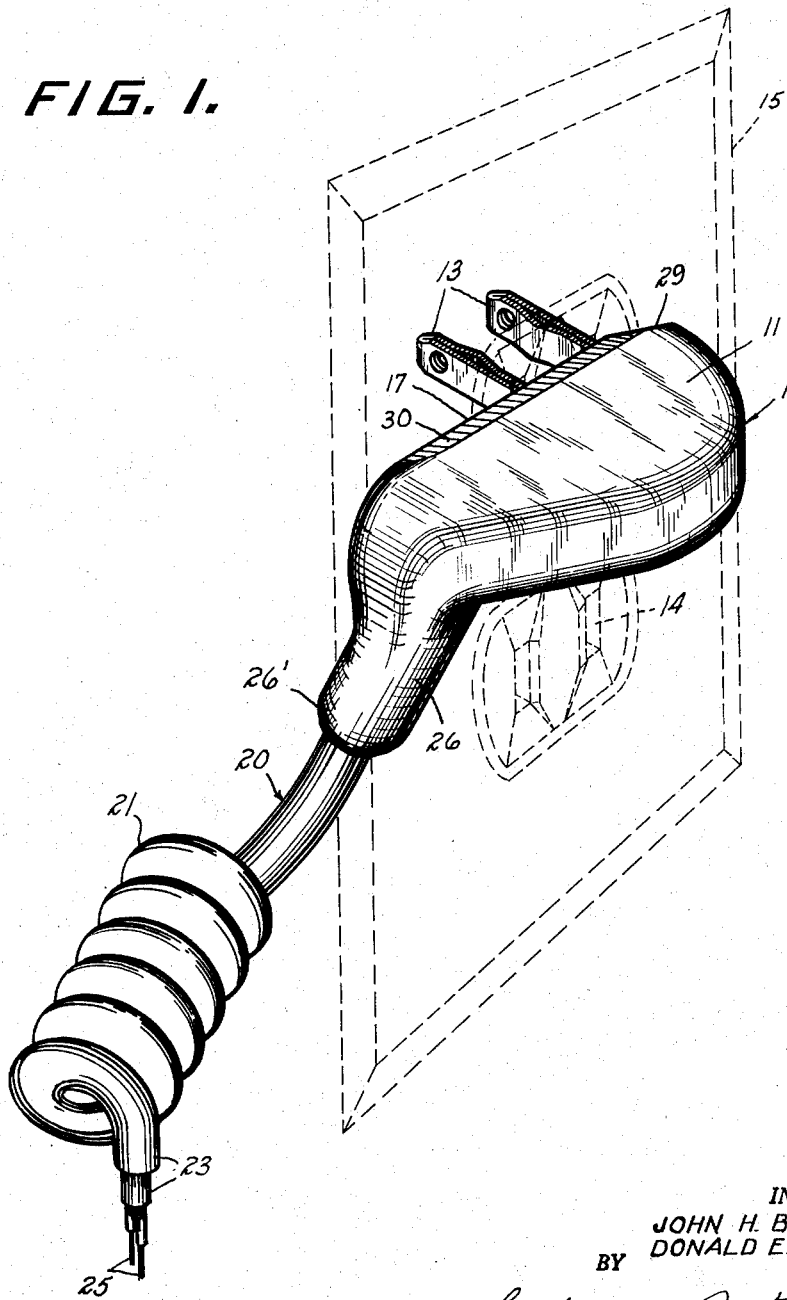
Fig. 1 is a perspective view of a plug constructed in accordance with the invention and attached to a retractile type cord, the plug being inserted in a conventional receptacle shown in phantom.

Referring now to the drawings, an electric plug 10 constructed in accordance with the invention comprises a plug body 11 provided with spaced prongs 13 which are arranged in parallel relationship for insertion in apertures 14 of a conventional outlet or receptacle 15 in electrical connection therewith. In the illustrated embodiment, the pair of prongs 13 have their inner ends embedded in the plug body 11 which is preferably of molded construction as shown so that the inner ends of the prongs 13 are molded within the plug body and are thus fixed in the position shown in Fig. 1.

As shown best in Fig. 4, the prongs 13 extend outwardly from, and perpendicular to, a substantially flat face 17 formed at the base of the plug body 11 so as to lie in flush-wise engagement with the outer face of the socket 15 when the prongs 13 are inserted within the outlet apertures 14. Although the plug 10 may be employed with any type of power cord, there is shown in Fig. 1 a spring-wound or retractile type cord 20 which contains a resilient, normally contracted, coiled portion 21 to permit the effective length of the cord 20 to be varied by a resilient expansion and contraction of portion 21. The power cord 20 illustrated comprises a plurality of sheaths 23, and two insulated conductors or wires 25 which are connected to the prongs 13 within the plug body 11.

As specifically illustrative of the practice of this invention, the power cord 20 enters the plug body through an integral sleeve or projection 26 extending diagonally outwardly from the body 11 and having its outer end 26' offset a substantial distance both longitudinally and transversely from the rectangular area or zone A bounded on opposite ends by the flat prongs 13, as shown in dotted lines in Fig. 4. As a result of the location of the entrance of the cord offset both longitudinally and transversely of the zone A, any pull or strain on the power cord 20 which exerts a force on the plug body 11 having a component tending to draw the plug from the receptacle will also have a component which imparts a twisting movement to the plug body which will bind the prongs 13 with the walls of the apertures 14 in outlet 15, rendering it practically impossible to pull the plug from the socket. The greater the spacing of the cord entrance from the prongs 13 the greater will be the twisting action and the greater the resistance to withdrawal of the plug. It has been found, in accordance with the invention, that a very strong locking force can be obtained with only a moderate offset, which is an advantage, since an excessive offset may be objectionable from a size and appearance standpoint. It has been found that a satisfactory compromise is to offset the cord entrance approximately one-half to two inches both transversely and longitudinally from the zone A which gives more than adequate locking action within desirable size limitations.

In order to reduce the moment arm on the plug resulting from a pull on the offset cord 20 and to eliminate the possibility of camming the plug from the outlet, it is preferred to bevel the edges 29 and 30 of face 17 which are opposite from the entrance of the cord 20. Thus no edge portions on the plug body 11 are present to contact the face of outlet 15 to act as a fulcrum when the plug is twisted by a pull on cord 20 thus greatly increasing the locking action.

It is an advantage of the invention that although the plug and cord assembly is constructed so that a pull on the cord will not dislodge the plug from a receptacle, the plug can easily be withdrawn when desired in the usual manner simply by grasping the plug body instead of the cord and pulling it out in the usual manner. This has a further advantage in correcting the habit of many users which is to pull out plugs by pulling on the cord which usually results in wear or damage.

It can thus be seen that a simple and inexpensive self-locking electric plug for electrical devices has been provided which may be molded-in-a-one-piece construction on a power cord similar to presently employed conventional plugs, but is of such a novel design that a self-locking feature is inherently provided that will prevent accidental withdrawal of the plug from its associated outlet during a strain or pull on the cord, such as occurs in the conventional plug construction. With the novel plug construction provided, no modification is required of the outlet, there is no need for additional gripping parts in either the outlet or the plug, and the plug may be withdrawn easily in the ordinary manner. Furthermore, a spring-wound or retractile cord may be employed with the plug to take full advantage of its novel self-locking features.

Changes in the form, construction and arrangement of the parts herein which are apparent to one skilled in the art are intended to be included within the scope of the invention.

We claim:

1. An electric plug and cord assembly of the type for use with a conventional receptacle comprising a plug body having two prongs on said body arranged in spaced parallel relationship and insertable within a receptacle in electrical connection therewith and a power cord electrically connected to said prongs within the plug body, said power cord being secured to the plug body at a point displaced longitudinally and laterally from a zone bounded at opposite ends by the said prongs whereby an outward pull on the cord imparts a twisting action to the plug binding the prongs in the receptacle and preventing its withdrawal therefrom, said body having a bevel edge area adjacent said zone opposite said point where the power cord is secured to the plug body.

2. An electric plug and cord assembly of the type for use with a conventional receptacle comprising a plug body, a pair of prongs extending from said body arranged in spaced parallel relationship and insertable within a receptacle in electrical connection therewith, a power cord electrically connected to said prongs within said plug body and secured to the plug body, and means extending beyond and forming an entrance to said plug body for the cord which is displaced longitudinally and laterally from a zone bounded at opposite ends by the said prongs whereby an outward pull on the cord imparts a twisting action to the plug binding the prongs in the receptacle and preventing its withdrawal therefrom, said body having bevel edges adjacent said zone opposite said entrance.

3. An electric plug and cord assembly of the type for use with a conventional receptacle comprising a plug body, a pair of prongs on said body arranged in spaced parallel relationship and insertable within said receptacle in electrical connection therewith, a power cord electrically connected to said prongs within said plug body, and a projection on said plug body forming an entrance for the power cord, said projection extending diagonally so as to space the entrance longitudinally and laterally from a zone bounded at opposite ends by the said prongs whereby an outward pull on the cord imparts a twisting action to the plug binding the prongs in the receptacle and preventing its withdrawal therefrom.

4. An electric plug and cord assembly of the type for use with a conventional receptacle comprising a plug body having a substantially flat face, a pair of prongs arranged in spaced parallel relationship for insertion within said receptacle in electrical connection therewith, said prongs extending outwardly from said face, and a power cord electrically connected to said prongs within said plug body, said power cord being secured to said plug body at an entrance spaced longitudinally and laterally from a zone bounded at opposite ends by said prongs whereby an outward pull on the cord imparts a twisting action to the plug, and said face being beveled along the boundary thereof diametrically opposite from the cord entrance to prevent fulcruming of the plug responsive to a pull on the cord.

5. An electric plug and cord assembly of the type for use with a conventional receptacle comprising a plug body having a substantially rectangular flat face, a pair of prongs arranged in spaced parallel relationship and integrally molded with said plug body so as to extend outwardly from and perpendicular to said plug face, said prongs being insertable within said outlet in electrical connection therewith, an integrally molded sleeve on said plug body extending diagonally away from the flat face, and a power cord electrically connected to said prongs within said molded plug body, said power cord extending through said sleeve so as to enter the plug body at a point displaced longitudinally and laterally from a zone bounded at opposite ends by said prongs, the edges of said rectangular face opposite from the sleeve being beveled to prevent fulcruming of the plug responsive to a pull on the cord.

References Cited in the file of this patent

UNITED STATES PATENTS

| | | |
|---|---|---|
| 1,984,181 | French | Dec. 11, 1934 |
| 2,301,258 | Corlew | Nov. 10, 1942 |